United States Patent
Loveridge et al.

(10) Patent No.: US 10,050,275 B2
(45) Date of Patent: Aug. 14, 2018

(54) BINDER FOR LITHIUM ION RECHARGEABLE BATTERY CELLS

(75) Inventors: Melanie J. Loveridge, Sutton Courtenay (GB); Michael Jonathan Lain, Abingdon (GB); Esam Kronfli, Swindon (GB)

(73) Assignee: Nexeon Limited, Abingdon (GB)

(*) Notice: Subject to any disclaimer, the term of this patent is extended or adjusted under 35 U.S.C. 154(b) by 0 days.

(21) Appl. No.: 13/265,473

(22) PCT Filed: May 7, 2010

(86) PCT No.: PCT/GB2010/000923
§ 371 (c)(1),
(2), (4) Date: Dec. 22, 2011

(87) PCT Pub. No.: WO2010/130976
PCT Pub. Date: Nov. 18, 2010

(65) Prior Publication Data
US 2012/0135308 A1     May 31, 2012

(30) Foreign Application Priority Data
May 11, 2009 (GB) .................... 0908088.8

(51) Int. Cl.
*H01M 4/62* (2006.01)
*H01M 4/134* (2010.01)
*H01M 4/38* (2006.01)
*H01M 10/052* (2010.01)

(52) U.S. Cl.
CPC .......... *H01M 4/621* (2013.01); *H01M 4/134* (2013.01); *H01M 4/386* (2013.01); *H01M 4/622* (2013.01); *H01M 4/38* (2013.01); *H01M 10/052* (2013.01); *Y10T 29/49115* (2015.01)

(58) Field of Classification Search
CPC .............................. H01M 4/386; H01M 4/622
See application file for complete search history.

(56) References Cited

U.S. PATENT DOCUMENTS

| | | |
|---|---|---|
| 3,351,445 A | 11/1967 | Fielder et al. |
| 4,002,541 A | 1/1977 | Streander |
| 4,436,796 A | 3/1984 | Huggins et al. |
| 4,614,696 A | 9/1986 | Ito et al. |
| 4,950,566 A | 8/1990 | Huggins et al. |
| 5,260,148 A | 11/1993 | Idota |
| 5,262,021 A | 11/1993 | Lehmann et al. |
| 5,660,948 A | 8/1997 | Barker |
| 5,907,899 A | 6/1999 | Dahn et al. |
| 5,980,722 A | 11/1999 | Kuroda et al. |
| 5,989,339 A | 11/1999 | Tamamura et al. |
| 6,022,640 A | 2/2000 | Takada et al. |
| 6,042,969 A | 3/2000 | Yamada et al. |
| 6,063,995 A | 5/2000 | Bohland et al. |
| 6,235,427 B1 | 5/2001 | Idota et al. |
| 6,296,969 B1 | 10/2001 | Yano et al. |
| 6,334,939 B1 | 1/2002 | Zhou et al. |
| 6,337,156 B1 | 1/2002 | Narang et al. |
| 6,353,317 B1 | 3/2002 | Green et al. |
| 6,399,177 B1 | 6/2002 | Fonash et al. |
| 6,399,246 B1 | 6/2002 | Vandayburg et al. |
| 6,589,696 B2 | 7/2003 | Matsubara et al. |
| 6,605,386 B1 | 8/2003 | Kasamatsu et al. |
| 6,620,547 B1 | 9/2003 | Sung et al. |
| 6,887,511 B1 | 5/2005 | Shima et al. |
| 6,916,679 B2 | 7/2005 | Snyder et al. |
| 7,033,936 B1 | 4/2006 | Green |
| 7,051,945 B2 | 5/2006 | Empedocles et al. |
| 7,070,632 B1 | 7/2006 | Visco et al. |
| 7,094,499 B1 | 8/2006 | Hung |
| 7,147,894 B2 | 12/2006 | Zhou et al. |
| 7,192,673 B1 | 3/2007 | Ikeda et al. |
| 7,298,017 B1 | 11/2007 | Liu et al. |
| 7,311,999 B2 | 12/2007 | Kawase et al. |
| 7,318,982 B2 | 1/2008 | Gozdz et al. |
| 7,348,102 B2 | 3/2008 | Li et al. |
| 7,358,011 B2 | 4/2008 | Fukuoka et al. |
| 7,378,041 B2 | 5/2008 | Asao et al. |
| 7,425,285 B2 | 9/2008 | Asao et al. |
| 7,476,469 B2 | 1/2009 | Ota et al. |
| 7,569,202 B2 | 8/2009 | Farrell et al. |
| 7,659,034 B2 | 2/2010 | Minami et al. |
| 7,674,552 B2 | 3/2010 | Nakai et al. |
| 7,767,346 B2 | 8/2010 | Kim et al. |
| 7,862,933 B2 | 1/2011 | Okumura et al. |
| 8,034,485 B2 | 10/2011 | Dehn et al. |
| 8,597,831 B2 | 12/2013 | Green et al. |

(Continued)

FOREIGN PATENT DOCUMENTS

| | | |
|---|---|---|
| CN | 1821446 | 8/2006 |
| CN | 1901260 | 1/2007 |

(Continued)

OTHER PUBLICATIONS

Nakahata et al., "Fabrication of Lotus-Type Porous Silicon by Unidirectional Solidification in Hyrdogen", Materials Science and Engineering A 384 (2004) 373-376.

(Continued)

*Primary Examiner* — Ladan Mohaddes
(74) *Attorney, Agent, or Firm* — McDonnell Boehnen Hulbert & Berghoff LLP (57) ABSTRACT

An electrode for lithium ion recharged battery cell includes current collectors, a cathode layer, a separator and a cohesive anode mass. The cohesive anode mass includes silicon as an active material and a polymeric binder. The polymeric binder is a homo-polymer or copolymer of one or more monomers selected from the group consisting of acrylic acid, 3-butenoic acid, 2-methacrylic acid, 2-pentenoic acid, 2,3-dimethylacrylic acid, 3,3-dymethylacrylic acid, trans-butenedioc acid, cis-butenedioc acid and itaconic acid and optionally an alkali metal salt thereof. The silicon can include 20 to 100% of the active material in the cohesive mass. The binder is mixed with the silicon to form the cohesive mass that adheres to the current collector and maintains the cohesive mass in electrical contact with the current collector.

31 Claims, 4 Drawing Sheets

(56) References Cited

U.S. PATENT DOCUMENTS

| | | |
|---|---|---|
| 2001/0023986 A1 | 9/2001 | Mancevski |
| 2002/0086211 A1* | 7/2002 | Umeno et al. ............ 429/231.4 |
| 2002/0148727 A1 | 10/2002 | Zhou et al. |
| 2003/0135989 A1 | 7/2003 | Huggins et al. |
| 2004/0072067 A1 | 4/2004 | Minami et al. |
| 2004/0126659 A1 | 7/2004 | Graetz et al. |
| 2004/0151987 A1 | 8/2004 | Kawase et al. |
| 2004/0166319 A1 | 8/2004 | Li et al. |
| 2004/0185346 A1 | 9/2004 | Takeuchi et al. |
| 2004/0197660 A1 | 10/2004 | Sheem et al. |
| 2004/0214085 A1 | 10/2004 | Sheem et al. |
| 2004/0224231 A1 | 11/2004 | Fujimoto et al. |
| 2004/0241548 A1 | 12/2004 | Nakamoto et al. |
| 2005/0042515 A1 | 2/2005 | Hwang et al. |
| 2005/0079414 A1 | 4/2005 | Yamamoto et al. |
| 2005/0079420 A1 | 4/2005 | Cho et al. |
| 2005/0118503 A1 | 6/2005 | Honda et al. |
| 2005/0191550 A1 | 9/2005 | Satoh et al. |
| 2005/0193800 A1 | 9/2005 | DeBoer et al. |
| 2005/0214644 A1 | 9/2005 | Aramata et al. |
| 2006/0003226 A1 | 1/2006 | Sawa et al. |
| 2006/0019115 A1 | 1/2006 | Wang et al. |
| 2006/0019168 A1 | 1/2006 | Li et al. |
| 2006/0024582 A1 | 2/2006 | Li et al. |
| 2006/0040182 A1 | 2/2006 | Kawakami et al. |
| 2006/0051670 A1 | 3/2006 | Mikio et al. |
| 2006/0057463 A1 | 3/2006 | Gao et al. |
| 2006/0088767 A1 | 4/2006 | Li et al. |
| 2006/0097691 A1 | 5/2006 | Green |
| 2006/0127773 A1 | 6/2006 | Kawakami et al. |
| 2006/0134516 A1 | 6/2006 | Im et al. |
| 2006/0134518 A1 | 6/2006 | Kogetsu et al. |
| 2006/0147800 A1 | 7/2006 | Sato et al. |
| 2006/0154071 A1 | 7/2006 | Homma et al. |
| 2006/0166093 A1 | 7/2006 | Zaghib et al. |
| 2006/0175704 A1 | 8/2006 | Shimizu et al. |
| 2006/0257307 A1 | 11/2006 | Yang |
| 2006/0263687 A1 | 11/2006 | Leitner et al. |
| 2006/0263688 A1 | 11/2006 | Guyomard et al. |
| 2006/0275663 A1 | 12/2006 | Matsuno et al. |
| 2006/0275668 A1 | 12/2006 | Peres et al. |
| 2006/0286448 A1 | 12/2006 | Snyder et al. |
| 2006/0286458 A1 | 12/2006 | Sato et al. |
| 2007/0002613 A1 | 1/2007 | Rahman et al. |
| 2007/0003835 A1 | 1/2007 | Hasegawa et al. |
| 2007/0026313 A1 | 2/2007 | Sano |
| 2007/0031733 A1 | 2/2007 | Kogetsu et al. |
| 2007/0037063 A1 | 2/2007 | Choi et al. |
| 2007/0048609 A1 | 3/2007 | Ueda |
| 2007/0059598 A1 | 3/2007 | Yang |
| 2007/0065720 A1 | 3/2007 | Hasegawa et al. |
| 2007/0072074 A1 | 3/2007 | Yamamoto et al. |
| 2007/0087268 A1 | 4/2007 | Kim et al. |
| 2007/0092796 A1* | 4/2007 | Matsuda et al. ............ 429/217 |
| 2007/0099084 A1 | 5/2007 | Huang et al. |
| 2007/0099085 A1 | 5/2007 | Choi et al. |
| 2007/0105017 A1 | 5/2007 | Kawase et al. |
| 2007/0117018 A1 | 5/2007 | Huggins |
| 2007/0122702 A1 | 5/2007 | Sung et al. |
| 2007/0148544 A1 | 6/2007 | Le |
| 2007/0172732 A1 | 7/2007 | Jung et al. |
| 2007/0184345 A1 | 8/2007 | Neudecker et al. |
| 2007/0190413 A1 | 8/2007 | Lee et al. |
| 2007/0202395 A1 | 8/2007 | Snyder et al. |
| 2007/0202402 A1 | 8/2007 | Asahina et al. |
| 2007/0207080 A1 | 9/2007 | Yang |
| 2007/0207385 A1 | 9/2007 | Liu et al. |
| 2007/0209584 A1 | 9/2007 | Kalynushkin et al. |
| 2007/0212538 A1 | 9/2007 | Niu |
| 2007/0218366 A1 | 9/2007 | Kalynushkin et al. |
| 2007/0224508 A1 | 9/2007 | Aramata et al. |
| 2007/0224513 A1 | 9/2007 | Kalynushkin et al. |
| 2007/0238021 A1 | 10/2007 | Liu et al. |
| 2007/0243469 A1 | 10/2007 | Kim et al. |
| 2007/0264564 A1 | 11/2007 | Johnson et al. |
| 2007/0264574 A1 | 11/2007 | Kim et al. |
| 2007/0269718 A1 | 11/2007 | Krause et al. |
| 2007/0277370 A1 | 12/2007 | Kalynushkin et al. |
| 2008/0003496 A1 | 1/2008 | Neudecker et al. |
| 2008/0003503 A1 | 1/2008 | Kawakami et al. |
| 2008/0020281 A1 | 1/2008 | Kogetsu et al. |
| 2008/0038638 A1 | 2/2008 | Zhang et al. |
| 2008/0090149 A1 | 4/2008 | Sano et al. |
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0187838 A1* | 8/2008 | Le .................... 429/231.95 |
| 2008/0206631 A1 | 8/2008 | Christensen et al. |
| 2008/0206641 A1 | 8/2008 | Christensen et al. |
| 2008/0233479 A1 | 9/2008 | Sung et al. |
| 2008/0233480 A1 | 9/2008 | Sung et al. |
| 2008/0241647 A1 | 10/2008 | Fukui et al. |
| 2008/0241703 A1 | 10/2008 | Yamamoto et al. |
| 2008/0248250 A1 | 10/2008 | Flemming et al. |
| 2008/0261112 A1 | 10/2008 | Nagata et al. |
| 2008/0286653 A1 | 11/2008 | Sano et al. |
| 2008/0305391 A1 | 12/2008 | Hirose et al. |
| 2009/0053589 A1 | 2/2009 | Obrovac et al. |
| 2009/0061322 A1* | 3/2009 | Kawakami et al. ..... 429/231.95 |
| 2009/0078982 A1 | 3/2009 | Rachmady et al. |
| 2009/0087731 A1 | 4/2009 | Fukui et al. |
| 2009/0101865 A1 | 4/2009 | Matsubara et al. |
| 2009/0117466 A1 | 5/2009 | Zhamu et al. |
| 2009/0123840 A1* | 5/2009 | Shirane et al. ............ 429/220 |
| 2009/0162750 A1* | 6/2009 | Kawakami et al. ........ 429/218.1 |
| 2009/0186267 A1 | 7/2009 | Tiegs |
| 2009/0239151 A1 | 9/2009 | Nakanishi et al. |
| 2009/0253033 A1 | 10/2009 | Hirose et al. |
| 2009/0269677 A1 | 10/2009 | Hirose et al. |
| 2009/0305129 A1 | 12/2009 | Fukui et al. |
| 2010/0009258 A1* | 1/2010 | Hasegawa et al. ........... 429/217 |
| 2010/0075217 A1* | 3/2010 | Yamamoto et al. ......... 429/152 |
| 2010/0085685 A1 | 4/2010 | Pinwill |
| 2010/0092868 A1 | 4/2010 | Kim et al. |
| 2010/0124707 A1 | 5/2010 | Hirose et al. |
| 2010/0136437 A1 | 6/2010 | Nishida et al. |
| 2010/0285358 A1 | 11/2010 | Cui et al. |
| 2010/0297502 A1 | 11/2010 | Zhu et al. |
| 2010/0330419 A1 | 12/2010 | Cui et al. |
| 2014/0087250 A1 | 3/2014 | Coowar et al. |

FOREIGN PATENT DOCUMENTS

| | | |
|---|---|---|
| CN | 100382362 C | 4/2008 |
| CN | 101266919 | 9/2008 |
| CN | 100431204 C | 11/2008 |
| CN | 101442124 A | 5/2009 |
| DE | 199 22 257 A1 | 11/2000 |
| DE | 103 47 570 A1 | 5/2005 |
| EP | 0 281 115 A2 | 9/1988 |
| EP | 0 553 465 A1 | 8/1993 |
| EP | 0 820 110 A2 | 1/1998 |
| EP | 1 011 160 A1 | 6/2000 |
| EP | 0 936 687 B1 | 12/2001 |
| EP | 1 231 653 A1 | 8/2002 |
| EP | 1 231 654 A1 | 8/2002 |
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |

(56) References Cited

FOREIGN PATENT DOCUMENTS

| | | |
|---|---|---|
| EP | 2 058 882 A1 | 5/2009 |
| EP | 2 204 868 A3 | 7/2010 |
| FR | 2 885 913 B1 | 8/2007 |
| GB | 0 980 513 | 1/1965 |
| GB | 1 014 706 | 12/1965 |
| GB | 2 395 059 A | 5/2004 |
| GB | 2 464 157 B | 1/2010 |
| GB | 2 464 158 | 4/2010 |
| JP | 02-209492 A | 8/1990 |
| JP | 06-283156 | 10/1994 |
| JP | 10-046366 | 2/1998 |
| JP | 10-083817 | 3/1998 |
| JP | 10-199524 | 7/1998 |
| JP | 11-176470 A | 7/1999 |
| JP | H11-176470 A | 7/1999 |
| JP | 2000-003727 | 1/2000 |
| JP | 2000-173594 | 6/2000 |
| JP | 2000-348730 A | 12/2000 |
| JP | 2001-291514 | 10/2001 |
| JP | 2002-260637 | 9/2002 |
| JP | 2002-260637 A | 9/2002 |
| JP | 2002-279974 A | 9/2002 |
| JP | 2002-313319 A | 10/2002 |
| JP | 2003-017040 | 1/2003 |
| JP | 2003-168426 | 6/2003 |
| JP | 2003-168426 A | 6/2003 |
| JP | 2003-522367 | 7/2003 |
| JP | 04-607488 B2 | 2/2004 |
| JP | 2004-071305 | 3/2004 |
| JP | 2004-095264 | 3/2004 |
| JP | 2004-185810 | 7/2004 |
| JP | 2004-214054 | 7/2004 |
| JP | 2004-281317 | 10/2004 |
| JP | 2004-296386 A | 10/2004 |
| JP | 2004-311429 A | 11/2004 |
| JP | 2004-533699 A | 11/2004 |
| JP | 2005-259635 A | 9/2005 |
| JP | 2005-310759 A | 11/2005 |
| JP | 2006-505901 A | 2/2006 |
| JP | 2006-196338 | 7/2006 |
| JP | 2006-196338 A1 | 7/2006 |
| JP | 2006-276214 A | 10/2006 |
| JP | 2006-290938 A | 10/2006 |
| JP | 2006-335410 A | 12/2006 |
| JP | 2006 339093 A | 12/2006 |
| JP | 2007-27084 | 2/2007 |
| JP | 2007080827 | 3/2007 |
| JP | 2007-165079 A | 6/2007 |
| JP | 2008-034266 | 2/2008 |
| JP | 2008-186732 | 8/2008 |
| JP | 2008210618 | 9/2008 |
| JP | 2008-234988 | 10/2008 |
| JP | 2008-235258 A | 10/2008 |
| JP | 2008-243661 | 10/2008 |
| JP | 2008-0288 059 A | 11/2008 |
| JP | 2008277000 | 11/2008 |
| JP | 2009-512160 A | 3/2009 |
| JP | 2009523923 | 6/2009 |
| JP | 2009-252348 A | 10/2009 |
| JP | 2010097761 | 4/2010 |
| JP | 2010192444 | 9/2010 |
| JP | 5000787 | 8/2012 |
| JP | 2013510405 | 3/2013 |
| KR | 20050090218 | 9/2005 |
| KR | 2007-023141 | 2/2007 |
| KR | 10-0721500 B1 | 5/2007 |
| KR | 2007-0110569 A | 11/2007 |
| KR | 2008-038806 A | 5/2008 |
| NL | 1015956 | 8/2000 |
| SU | 471402 | 5/1975 |
| SU | 544019 | 1/1977 |
| WO | WO 1999/33129 | 7/1999 |
| WO | WO 2001/13414 A1 | 2/2001 |
| WO | WO 2001/35473 A1 | 5/2001 |
| WO | WO 2001/96847 A1 | 12/2001 |
| WO | WO 2002/25356 A2 | 3/2002 |
| WO | WO 2002/47185 A2 | 6/2002 |
| WO | WO 2003/063271 A1 | 7/2003 |
| WO | WO 2003/075372 A2 | 9/2003 |
| WO | WO 2004/042851 A2 | 5/2004 |
| WO | WO 2004/052489 A2 | 6/2004 |
| WO | WO 2004/083490 A2 | 9/2004 |
| WO | WO 2004/086539 A1 | 10/2004 |
| WO | 2004109839 | 12/2004 |
| WO | WO 2005/011030 A1 | 2/2005 |
| WO | WO 2005/113467 A1 | 12/2005 |
| WO | WO 2005/119753 A2 | 12/2005 |
| WO | WO 2006/067891 A1 | 6/2006 |
| WO | WO 2006/073427 A2 | 7/2006 |
| WO | WO 2006/120332 A2 | 11/2006 |
| WO | WO 2007/044315 A1 | 4/2007 |
| WO | WO 2007/083152 A1 | 7/2007 |
| WO | WO 2007/083155 | 7/2007 |
| WO | WO 2007/114168 A1 | 10/2007 |
| WO | WO 2007/136164 A1 | 11/2007 |
| WO | WO 2008/029888 A1 | 3/2008 |
| WO | WO 2008/044683 A1 | 4/2008 |
| WO | WO 2008/072460 A1 | 6/2008 |
| WO | WO 2008/097723 A1 | 8/2008 |
| WO | WO 2008/139157 A1 | 11/2008 |
| WO | WO 2009/010748 A1 | 1/2009 |
| WO | WO 2009/010757 | 1/2009 |
| WO | WO 2009/010758 | 1/2009 |
| WO | WO 2009/010759 | 1/2009 |
| WO | WO 2009/026466 | 2/2009 |
| WO | WO 2009/120404 A1 | 10/2009 |
| WO | WO 2009/128800 | 10/2009 |
| WO | WO 2009128589 | 10/2009 |
| WO | WO 2010/040985 | 4/2010 |
| WO | WO 2010/040986 | 4/2010 |
| WO | WO 2010/060348 A1 | 6/2010 |
| WO | WO 2010/130975 A1 | 11/2010 |
| WO | WO 2010/130976 A1 | 11/2010 |

OTHER PUBLICATIONS

Niparko, J.K. (Editor), "Cochlear Implant Technology", Pub., Lippincott Williams and Wilkins, Philadelphia, (2000) 108-121.

Obrovac et al., "Structural Changes in Silicon Anodes During Lithium Insertion/Extraction", Electrochemical and Solid-State Letters, 7(5), (2004), A96-A96.

Ohara et al., "A Thin Film Silicon Anode for Li-Ion Batteries Having a Very Large Specific Capacity and Long Cycle Life", Journal of Power Sources, 136 (2004) 303-306.

Pei et al., "Silicon Nanowires Grown from Silicon Monoxide Under Hydrothermal Conditions", Journal of Crystal Growth, 289 (2006) 423-427.

Peng et al., "Dendrite-Assisted Growth of Silicon Nanowires in Electroless Metal Deposition", Adv. Funct. Mater., 13, No. 2 (2003) 127-132.

Peng et al., "Fabrication of Large-Area Silicon Nanowire p-n Junction Diode Arrays", Adv. Mater. (2004), vol. 16, No. 1, 73-76.

Peng et al., "Silicon Nanowires for Rechargeable Lithium-ion Battery Anodes", Applied Physics Letters (2008) vol. 93, No. 3, pp. 33105-1 to 33105-3.

Peng et al., "Simultaneous Gold Deposition and Formation of Silicon Nanowire Arrays", Journal of Electroanalytical Chemistry, 558 (2003) 35-39.

Peng et al., "Synthesis of Large-Area Silicon Nanowire Arrays via Self-Assembling Nanoelectrochemistry", Adv. Mater., 14, No. 16 (2002) 1164-1167.

Peng et al., "Uniform, Axial-Orientation Alignment of One-Dimensional Single-Crystal Silicon Nanostructure Arrays", Angew. Chem. Ind. Ed., 44 (2005) 2737-2742.

Peng, et al., "Fabrication of Single-Crystalline Silicon Nanowires by Scratching a Silicon Surface with Catalytic Metal Particles", Adv. Funct. Mater., 16 (2006), 387-394.

Hochgatterer et al., "Silicon/Graphite Composite Electrodes for High Capacity Anodes: Influence of Binder Chemistry on Cycling Stability", Electrochemical and Solid-State Letters, 11 (5) (2008) A76-A80.

(56) References Cited

OTHER PUBLICATIONS

Huggins, Robert A., "Lithium Alloy Anodes" in Handbook of Battery Materials, J.O. Besenhard Ed., Wiley-VCH, Weinheim, 361-381 (1999).
Ivanovskaya et al., "The Effect of Treatment of Cation-Selective Glass Electrodes With AgNO3 Solution on Electrode Properties", Sensors and Actuators B 24-25 (1995) 304-308.
Jianfeng et al., "Large-Scale Array of Highly Oriented Silicon-Rich Micro/Nanowires Induced by Gas Flow Steering", Solid State Communications, 133 (2005) 271-275.
Kasavajjula et al., "Nano- and Bulk-Silicon-Based Insertion Anodes for Lithium-Ion Secondary Cells", Journal of Power Sources, 163 (2007) 1003-1039.
Key to Metal Aluminum-Silicon Alloys, www.keytometals.com/Article80.
Kim et al., "(110) Silicon Etching for High Aspect Ratio Comb Structures", 1997 6th International Conference on Emerging Technologies and Factory Automation Proceedings, (1997) 248-252.
Kim et al., "Improvement of Silicon Powder Negative Electrodes by Copper Electroless Deposition for Lithium Secondary Batteries", Journal of Power Sources, 147 (2005) 227-233.
Kleimann et al., "Formation of Wide and Deep Pores in Silicon by Electrochemical Etching", Materials Science and Engineering, B69-70 (2000) 29-33.
Kolasinski, Kurt W., "Silicon Nanostructures from Electroless Electrochemical Etching", Current Opinion in Solid State and Materials Science, 9 (2005) 73-83.
Komba et al., "Functional Interface of Polymer Modified Graphite Anode", Journal of Power Sources, 189, (2009), 197-203.
Komba et al., "Polyacrylate as Functional Binder for Silicon and Graphite Composite Electrode in Lithium-Ion Batteries", Electrochemistry, 79(1), (2010), 6-9.
Badel et al., "Formation of Ordered Pore Arrays at the Nanoscale by Electrochemical Etching of N-Type Silicon", Superlattices and Microstructures, 36 (2004) 245-253.
Barraclough et al., "Cold Compaction of Silicon Powders Without a Binding Agent", Materials Letters 61 (2007) 485-487.
Beaulieu et al., "Colossal Reversible Volume Changes in Lithium Alloys", Electrochemical and Solid-State Letters, 4 (9) (2001) A137-A140.
Beaulieu et al., "Reaction of Li with Grain-Boundary Atoms in Nanostructured Compounds", Journal of the Electrochemical Society, 147 (9) (2000) 3206-3212.
International Search Report for PCT/GB2010/000923 dated Jul. 20, 2010.
Written Opinion of the International Searching Authority for PCT/GB2010/000923 dated Jul. 20, 2010.
International Preliminary Report on Patentability for PCT/GB2010/000923 dated May 30, 2011.
Besenhard et al., "Will Advanced Lithium-Alloy Anodes Have a Chance in Lithium-Ion Batteries?", Journal of Power Sources, 68 (1997) 87-90.
Boukamp et al., "All-Solid Lithium Electrodes with Mixed-Conductor Matrix", J. Electrochem. Soc.: Electrochemical Science and Technology, vol. 128, No. 4, (1981) 725-729.
Bourderau, et al., "Amorphous Silicon as a Possible Anode Material for Li-Ion Batteries", Journal of Power Sources, 81-82 (1999) 233-236.
Canham, L. T., "Diffusion of Li IN Si", Properties of Silicon, EMIS Datareviews Series No. 4 (1987) 454-462.
Chan et al., "Surface Chemistry and Morphology of the Solid Electrolyte Interphase on Silicon Nanowire Lithium-Ion Battery Anodes", Journal of Power Sources, 189(2), 1132-1140, (2009).
Chang et al., "Ultrafast Growth of Single-Crystalline Si Nanowires", Materials Letters, 60 (2006) 2125-2128.
Chen et al., Binder Effect on Cycling Performance of Silicon/Carbon Composite Anodes for Lithium Ion Batteries, 36 (2006) 1099-1104.
Chen et al., "Effect of Vinylene Carbonate (VC) as Electrolyte Additive on Electrochemical Performance of Si Film Anode for Lithium Ion Batteries", Journal of Power Sources, 174(2), 538-543, (2007).
Chen et al., "Selective Etching of Silicon in Aqueous Ammonia Solution", Sensors and Actuators, A 49 (1995) 115-121.
Chevrier et al., "Methods for Successful Cycling of Alloy Negative Electrodes in Li-Ion Cells", $220^{th}$ ECS Meeting, Abstract #1237 (2011).
Choi et al., "Effect of Fluoroethylene Carbonate Additive on Interfacial Properties of Silicon Thin-Film Electrode", Journal of Power Sources, 161(2), 1254-1259 (2006).
Colinge, Jean-Pierre, "Silicon-on-Insulator Technology: Materials to VLSI", Chapter 2, SOI Materials, (1991), Cover page and page 38.
Deal et al., "General Relationship for the Thermal Oxidation of Silicon", Journal of Applied Physics, vol. 36, No. 12, (Dec. 1965) 3770-3778.
El Ouatani et al., "The Effect of Vinylene Carbonate Additive on Surface Film Formation on Both Electrodes in Li-Ion Batteries", J. Electrochem. Soc., 156(2), A103-A113 (2009).
Feng et al., "Lithography-Free Silicon Micro-Pillars as Catalyst Supports for Microfabricated Fuel Cell Applications", Electrochemistry Communications, 8 (2006) 1235-1238.
Green et al., "Mesoscopic Hemisphere Arrays for use as Resist in Solid State Structure Fabrication", J. Vac. Sci. Technol. B 17(5) (1999) 2074-2083.
Green et al., "Quantum Pillar Structures on n+ Gallium Arsenide Fabricated Using "Natural" Lithography", Appl. Phys. Lett., 62 (3) (1993) 264-266.
Green et al., "Structured Silicon Anodes for Lithium Battery Applications", Electrochemical and Solid-State Letters, 6 (5) (2003) A75-A79.
Han et al., "Neutralized Poly (Acrylic Acid) as Polymer Binder for High Capacity Silicon Negative Electrodes", $220^{th}$ ECS Meeting, Abstract #1250 (2011).
Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).
Komba et al., "Polyacrylate Modifier for Graphite Anode of Lithium-Ion Batteries", Electrochemical and Solid-State Letters, 12(5), (2009), A107-A110.
Komba et al., "Study on Polymer Binders for High-Capacity SiO Negative Electrode of Li-Ion Batteries", Journal of Physical Chemistry, 115, (2011), 13487-13495.
Lang, Walter, "Silicon Microstructuring Technology", Materials Science and Engineering, R17 (1996) 1-55.
Lee et al., "Effect of Poly (Acrylic Acid) on Adhesion Strength and Electrochemical Performance of Natural Graphite Negative Electrode for Lithium-Ion Batteries", Journal of Power Sources, 161(1), (2006), 612-616.
Li et al., "A High Capacity Nano-Si Composite Anode Material for Lithium Rechargeable Batteries", Electrochemical and Solid-State Letters, 2 (11) (1999) 547-549.
Li et al., "Sodium Carboxymethyl Cellulose: a Potential Binder for Si Negative Electrodes for Li-Ion Batteries", Electrochemical and Solid-State Letters, 10(2) (2007), A17-A20.
Li et al., "The Crystal Structural Evolution of Nano-Si Anode Caused by Lithium Insertion and Extraction at Room Temperature", Solid State Ionics, 135 (2000) 181-191.
Liu et al., "A Novel Method of Fabricating Porous Silicon Material: Ultrasonically Enhanced Anodic Electrochemical Etching", Solid State Communications, 127 (2003) 583-588.
Liu et al., "Effect of Electrode Structure on Performance of Si Anode in Li-Ion Batteries: Si Particle Size and Conductive Additive", Journal of Power Source, 140 (2005) 139-144.
Liu et al., "Enhanced Cycle Life of Si Anode for Li-Ion Batteries by Using Modified Elastomeric Binder", Electrochemical and Solid-State Letters, 8(2) (2005), A100-A103.
Lu et al., "A Study of the Mechanisms of Erosion in Silicon Single Crystals Using Hertzian Fracture Tests", Wear, 186-187 (1995) 105-116.

(56) References Cited

OTHER PUBLICATIONS

Maranchi et al., "Interfacial Properties of the a-Si/Cu:Active-Inactive Thin-Film Anode Systems for Lithium-Ion Batteries", Journal of the Electrochemical Society: 153 (6) (2006) A1246-A1253.
Wong et al., "Controlled Growth of Silicon Nanowires Synthesized Via Solid-Liquid-Solid Mechanism", Science and Technology of Advanced Materials, 6 (2005) 330-334.
Yabuuchi et al., "Graphite-Silicon-Polyacrylate Negative Electrodes in Ionic Liquid Electrolyte for Safer Rechargeable Li-Ion Batteries", Advanced Energy Materials, 1, (2011), 759-765.
Yan et al., "Growth of Amorphous Silicon Nanowires via a Solid-Liquid-Solid Mechanism", Chemical Physics Letters, 323 (2000) 224-228.
Yan et al., "$H_2$-Assisted Control Growth of Si Nanowires", Journal of Crystal Growth, 257 (2003) 69-74.
Yoshio et al., "Electrochemical Behaviors of Silicon Based Anode Material", Journal of Power Sources, 153 (2006) 375-379.
Zhang et al., "A Review on Electrolyte Additives for Lithium-Ion Batteries", Journal of Power Sources, 162(2), 1379-1394, (2006).
Zhang et al., "Bulk-Quantity Si Nanowires Synthesized by SiO Sublimation", Journal of Crystal Growth, 212 (2000) 115-118.
Zhang et al., "Catalytic Growth of $^x$-FiSi$_2$ and Silicon Nanowires", Journal of Crystal Growth, 280 (2005) 286-291.
Zhang et al., "Synthesis of Thin Si Whiskers (Nanowires) Using SiCl$_4$", Journal of Crystal Growth, 2006 (2001) 185-191.
Qiu et al., "From S1 Nanotubes to Nanowires: Synthesis, Characterization, and Self- Assembly", Journal of Crystal Growth, 277 (2005) 143-148.
Qiu et al., "Self-Assembled Growth and Optical Emission of Silver-Capped Silicon Nanowires", Applied Physics Letters, vol. 84, No. 19, (2004) 3867-3869.
Sharma et al., "Thermodynamic Properties of the Lithium-Silicon System", J. Electrochem. Soc.: Electrochemical Science and Technology, vol. 123 (1976) 1763-1768.
Shin et al., "Porous Silicon Negative Electrodes for Rechargeable Lithium Batteries", Journal of Power Sources, 139 (2005) 314-320.
Sugama, et al., "Nature of Interfacial Interaction Mechanisms Between Polyacrylic Acid Macromolecules and Oxide Metal Surfaces", Journal of Materials Science, 19 (1984) 4045-4056.
Tokoro et al., "Anisotropic Etching Properties of Silicon in KOH and TMAH Solutions", Proceedings of the 1998 International Symposium on Micromechatronics and Human Science (1998) 65-70.
Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.
Ui et al., "Improvement of Electrochemical Characteristics of Natural Graphite Negative Electrode Coated With Polyacrylic Acid in Pure Propylene Carbonate Electrolyte", Journal of Power Sources, 173(1), (2007), 518-521.
Wagner et al., "Vapor-Liquid-Solid Mechanism of Single Crystal Growth", Applied Physics Letters, vol. 4, No. 5 (1964) 89-90.
Wen et al., "Chemical Diffusion in Intermediate Phases in the Lithium-Silicon System", Journal of Solid State Chemistry, 37 (1981) 271-278.
Weydanz et al., "A Room Temperature Study of the Binary Lithium-Silicon and the Ternary Lithium-Chromium-Silicon System for use in Rechargeable Lithium Batteries", Journal of Power Sources, 81-82 (1999) 237-242.
Winter, et al., "Insertion Electrode Materials for Rechargeable Lithium Batteries", Advanced Materials, 1998, 10, No. 10.
De Angelis et al., "Water Soluble Nanoporous Nanoparticles for In Vivo Targeted Drug Deliver and Controlled Release in B Cells Tumor Context", Nanoscale, 1020, vol. 2, p. 2230-2236.
Garrido, et al., The Role of Chemical Species in the Passivation of <100> Silicon Surfaces by HF in Water-Ethanol Solutions, J. Electrochem Soc., vol. 143, No. 12, 1996, p. 4059-4066.
Russo, et al., "A Mechanical Approach to Porous Silicon Nanoparticles Fabrication", Materials 2011, vol. 4, p. 1023-1033.
Takami et al., "Silicon Fiber Formed on Silicon Without Using a Gas Process", Journal of Applied Physics, vol. 91, No. 12, 2-5 (2002).
Ye et al., Controllable Growth of Silver Nanostructures by a Simple Replacement Reaction and Their SERS Studies, Solid State Sciences 11 (2009), p. 1088-1093.
Office Action issued in Application No. 10 718 266.9 dated Mar. 23, 2015.
Office Action issued in Application No. 10 718 652.0 dated Mar. 23, 2015.
Office Action dated Oct. 10, 2016 in copending U.S. Appl. No. 14/353,730.
Response filed Aug. 1, 2016 in U.S. Appl. No. 13/353,730.
Declaration Pursuant to 37 CFR 1.132 filed Aug. 1 in U.S. Appl. No. 13/353,730.
Office Action dated Apr. 1, 2016 in U.S. Appl. No. 13/353,730.
Response and Declaration Pursuant to 37 CF$ 1.132 filed Aug. 31, 2016 in U.S. Appl. No. 13/286,864.
Office Action dated Jun. 1, 2016 in U.S. Appl. No. 13/286,864.
Response filed with Request for Continued Examination and Declaration filed Feb. 18, 2016 in U.S. Appl. No. 13/286,864.
Interview Summary dated Dec. 16, 2015 in U.S. Appl. No. 13/286,864.
Office Action dated Sep. 10, 2015 in U.S. Appl. No. 13/286,864.
Response filed with Request for Continued Examination and Declaration filed Mar. 31, 2016 in U.S. Appl. No. 13/286,864.
Office Action dated Dec. 31, 2014 in U.S. Appl. No. 13/286,864.
Response filed Aug. 19, 2014 in U.S. Appl. No. 13/286,864.
Office Action dated May 20, 2014 in U.S. Appl. No. 13/286,864.
Response filed Jan. 23, 2014 in U.S. Appl. No. 13/286,864.
Office Action dated Oct. 23, 2013 in U.S. Appl. No. 13/286,864.
Peng, K. et al., Metal-Particle-Induced, Highly Localized Site-Specific Etching of Si and Formation of Single-Crystalline Si Nanowires in Aqueous Fluoride Solution, Chemistry A European Journal, 2006, 12, 7942-47 (2006).
Peng et al. "Comparative Analysis of Two Different Treatment Technology in PCB Spent Etching-Cyclic Regeneration Technique and Copper Sulfate Processing Technique," Printed Circuit Information, No. 7, pp. 51-53, dated Jul. 10, 2007.
Office Action dated Apr. 1, 2016 in copending U.S. Appl. No. 14/353,730.

\* cited by examiner

FIGURE 1

Figure 2.     Comparison of first cycle losses with different binders

Figure 3.     Total Delithiation Capacity Over One Hundred Cycles

BINDER FOR LITHIUM ION RECHARGEABLE BATTERY CELLS

TECHNICAL FIELD

The invention relates to lithium ion rechargeable battery cells and especially to a binder for use in such cells.

BACKGROUND ART

Figure 1:
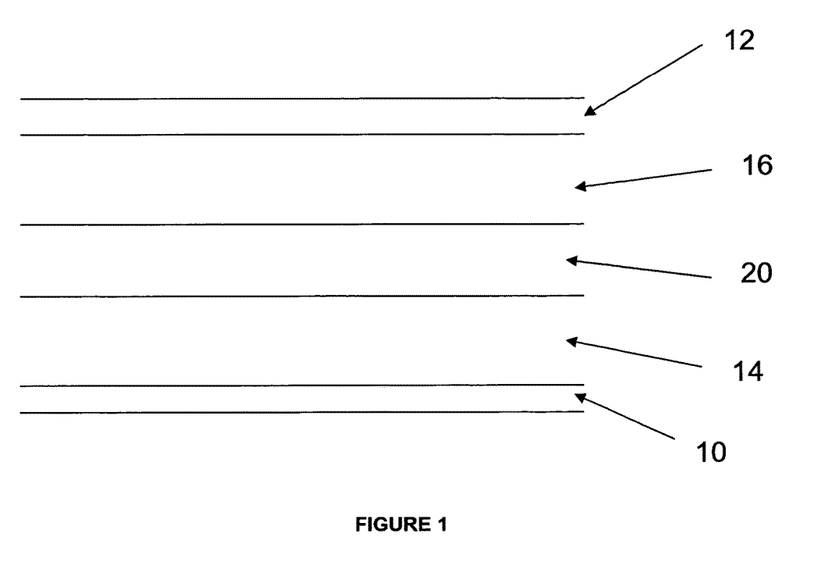
FIG. 1 is a schematic representation of a lithium ion cell.

Lithium-ion rechargeable battery cells currently use a carbon/graphite-based anode. The basic composition of a conventional lithium-ion rechargeable battery cell including a graphite-based anode electrode is shown in FIG. 1. A battery may include a single cell but may also include more than one cell.

The battery cell generally comprises a copper current collector 10 for the anode and an aluminium current collector 12 for the cathode, which are externally connectable to a load or to a recharging source as appropriate. It should be noted that the terms "anode" and "cathode" are used in the present specification as those terms are understood in the context of batteries placed across a load, i.e. the term "anode" denotes the negative pole and the term "cathode" the positive pole of the battery. A graphite-based composite anode layer 14 overlays the current collector 10 and a lithium containing metal oxide-based composite cathode layer 16 overlays the current collector 12. A porous plastic spacer or separator 20 is provided between the graphite-based composite anode layer 14 and a lithium containing metal oxide-based composite cathode layer 16: a liquid electrolyte material is dispersed within the porous plastic spacer or separator 20, the composite anode layer 14 and the composite cathode layer 16. In some cases, the porous plastic spacer or separator 20 may be replaced by a polymer electrolyte material and in such cases the polymer electrolyte material is present within both the composite anode layer 14 and the composite cathode layer 16.

When the battery cell is fully charged, lithium has been transported from the lithium containing metal oxide in the cathode via the electrolyte into the graphite-based anode where it is intercalated by reacting with the graphite to create a lithium carbon compound, typically $LiC_6$. The graphite, being the electrochemically active material in the composite anode layer, has a maximum capacity of 372 mAh/g.

It is well known that silicon can be used instead of graphite as the active anode material (see, for example, Insertion Electrode Materials for Rechargeable Lithium Batteries, M. Winter, J. O. Besenhard, M. E. Spahr, and P. Novak in Adv. Mater. 1998, 10, No. 10). It is generally believed that silicon, when used as an active anode material in a lithium-ion rechargeable cell, can provide a significantly higher capacity than the currently used graphite. Silicon, when converted to the compound $Li_{21}Si_5$ by reaction with lithium in an electrochemical cell, has a theoretical maximum capacity of 4,200 mAh/g, considerably higher than the maximum capacity for graphite. Thus, if graphite can be replaced by silicon in a lithium rechargeable battery, a substantial increase in stored energy per unit mass and per unit volume can be achieved.

In lithium-ion rechargeable battery cells using a graphite-based anode, the graphite is in the form of a fine powder whose particles are held together by a binder. Polyvinylidene fluoride (PVDF) and styrene butadiene rubber (SBR) are the most commonly used binders in graphite anodes but other binders have been suggested, for example U.S. Pat. No. 5,660,948 discloses the following binders in a carbon anode of a lithium ion cell: ethylene-propylenediene termonomer, PVDF, ethylene-acrylic acid copolymer and ethylene vinyl acetate copolymer.

U.S. Pat. No. 6,399,246 teaches that poly(acrylic acid) does not provide good adhesive properties in graphite anodes of lithium-ion battery cells and claims the use of a polyacrylamide binder.

U.S. Pat. No. 6,620,547 discloses a lithium secondary cell having a carbon anode, in which lithium may be intercalated, and a cathode formed from a transition metal held by a matrix polymer. The polymer used has an affinity for the transition metal ions so that they are held on the polymer chains. The polymer may be selected from a number of materials such as polyacrylate, poly(acrylic acid), polymethylmethacrylate, poly(vinyl pyrrolidone), polyacrylonitrile, poly(vinylidene fluoride) and poly(vinyl chloride).

U.S. Pat. No. 5,260,148 discloses a lithium secondary cell having an anode formed from a lithium compound that is held together by a binder, which may be starch, carboxymethyl cellulose (CMC), diacetyl cellulose, hydroxypropyl cellulose, ethylene glycol, poly(acrylic acid), polytetrafluoroethylene and poly(vinylidene fluoride).

The most common binders used in graphite anodes of lithium ion cells (PVDF and SBR) do not bind silicon electrode material cohesively together in silicon-based anodes over successive charging cycles and it is believed that this is due to the relatively large volume changes associated with the insertion and removal of lithium ions into the silicon material during the charging and discharging stages of the cells. The volume changes are much larger than in the corresponding graphite anodes and can result in individual silicon particles not always re-establishing electrical contact with each other and with a current collector when the silicon anode shrinks due to the removal of lithium ions during discharging.

An alternative binder that has been proposed for silicon systems is sodium carboxymethylcellulose (NaCMC) NaCMC adequately functions as a binder when used in conjunction with high purity silicon, of the type used to fabricate integrated circuit (IC) Si-wafers. However, such silicon is very expensive. When using relatively cheap, lower-grade silicon, there are minor amounts of impurities present that are not chemically compatible with the binder solution and that cause a decrease in the viscosity of the silicon/binder mixture. As a consequence, the resulting coating does not retain sufficient contact with the current collector so as to undergo anything more than a limited number of discharge/recharge cycles, before losing its capacity to hold a charge.

*Journal of Applied Electrochemistry* (2006) 36:1099-1104 discloses the use of an acrylic adhesive as a binder for the anode of Li-ion batteries. The anode material is a Si/C composite so has a lower volume change than electrodes where the anode is Si alone. There is no disclosure of the nature of the acrylic adhesive other than a reference to product LA132 whose composition is believed to be a mixture of acrylonitrile and butadiene in methylethyl ketone, ethyl acetate and toluene.

*J Power Sources,* 161 (2006), 612-616 describes a carbon anode of a lithium ion battery, which also contains NaCMC as a thickening agent and SBR as the binder. PAA (poly(acrylic acid)) is added as a surface active dispersing agent.

*J Power Sources,* 173 (2007), 518-521 addresses a problem of graphite electrodes for Li-ion cells when using propylene carbonate solvent/electrolyte since the propylene carbonate is intercalcated into the graphite electrode during charge/discharge, causing solvent decomposition and graphite exfoliation. The addition of PAA solves this problem.

DISCLOSURE OF THE INVENTION

It is an object of the present invention to find a binder that can satisfactorily bind together a range of particulate silicon material, and especially particles made of the relatively cheap "lower grade" silicon, in the electrode of a rechargeable lithium ion cell over a substantial number of discharge/recharge cycle before losing its capacity to hold a charge, despite the large volume changes associated with the insertion and removal of lithium ions into the silicon material during such cycles.

Surprisingly, it has been found that poly(acrylic acid) (PAA) is a good binder for particulate silicon material in an electrode of a rechargeable lithium ion cell despite the large volume changes associated with the discharging/recharging cycles and that it can be used with both high purity (99.90% pure or above) silicon and lower purity (less than 99.90% pure) silicon.

A first aspect of the invention provides an electrode for a lithium ion rechargeable battery cell comprising:
a current collector, and
a cohesive mass comprising silicon as an active material and a polymeric binder, characterized in that the polymeric binder is a homo-polymer or copolymer of one or more monomers selected from the group consisting acrylic acid, 3-butenoic acid, 2-methacrylic acid, 2-pentenoic acid, 2,3-dimethylacrylic acid, 3,3-dimethylacrylic acid, trans-butenedioc acid, cis-butenedioc acid and itaconic acid, and optionally an alkali metal salt thereof, wherein the silicon comprises 20 to 100% of the active material and wherein the binder is mixed with the silicon to form a cohesive mass that adheres to the current collector and maintains said cohesive mass in electrical contact with the current collector.

The binder is suitably in the form of a homopolymer or a copolymer. Typical: copolymers include alternating copolymers, block copolymers, periodic copolymers and statistical copolymers. Such polymers can be formed from different combinations of the monomer units referred to above and also from the reaction of polymer blocks formed from such monomer units.

Suitable alkali metal salts of these polymers include salts of lithium, sodium and potassium. Alkali metal salts of polyacrylic acid are preferred, especially the sodium and lithium salts thereof.

As mentioned above, although the use of poly(acrylic acid) as an alternative binder to the more commonly used PVDF and SBR binders used in graphite electrodes of lithium ion cells is known, the volume changes that occur during the charging/discharging cycles using silicon as an active material in an electrode are considerably greater than when using graphite as the active material. In addition, U.S. Pat. No. 6,399,246 teaches that poly(acrylic acid) does not provide good adhesive (binder) properties for graphite anode material in a lithium ion cell.

The finding by the inventors that poly(acrylic acid) is able to effectively bind silicon as an active material in an electrode of a lithium ion battery is therefore both surprising and unexpected.

In contrast to NaCMC, the acrylic binders of the present invention can be used with all grades of silicon in a Li-ion electrode and enable a stable cycle life performance whilst also overcoming the potential instability of the NaCMC binder to impurity elements that can be present in lower cost grades of silicon.

Beside PAA, other polymeric acrylic acid derivatives can be used as binders, as set out in Table 1, and mixtures of such binders can also be used:

TABLE 1

| Name | Monomer | Polymer |
| --- | --- | --- |
| Acrylic acid | $CH_2:CH \cdot COOH$ | $(CH_2 \cdot CH \cdot COOH)_n$ |
| 3-Butenoic acid (vinyl acetic acid) | $CH_2:CH \cdot CH_2 \cdot COOH$ | $(CH_2 \cdot CH \cdot CH_2 \cdot COOH)_n$ |
| 2-Methacrylic acid | $CH_2:C(CH_3) \cdot COOH$ | $(CH_2 \cdot C(CH_3) \cdot COOH)_n$ |
| 2-Pentenoic acid | $CH_3 \cdot CH_2 \cdot CH:CH \cdot COOH$ | $(CH_3 \cdot CH_2 \cdot CH \cdot CH \cdot COOH)_n$ |
| 2,3 Dimethyl-acrylic acid (tiglic acid) | $CH_3 \cdot CH:C(CH_3) \cdot COOH$ | $(CH3 \cdot CH \cdot C(CH_3) \cdot COOH)_n$ |
| 3,3 Dimethacrylic acid | $(CH_3)_2 \cdot C:CH \cdot COOH$ | $(CH_3)_2 \cdot CH \cdot CH \cdot COOH)_n$ |
| Trans-butenedioic acid (fumaric acid) | $CH(COOH):CH \cdot COOH$ | $(CH(COOH) \cdot CH \cdot COOH)_n$ |
| Cis-butenedioic acid (maleic acid) | $CH(COOH):CH \cdot COOH$ | $(CH(COOH) \cdot CH \cdot COOH)_n$ |
| Itaconic acid | $CH_2:C(COOH) \cdot CH_2 \cdot COOH$ | $(CH_2 \cdot C(COOH) \cdot CH_2 \cdot COOH)_n$ |

Co-polymers of one or more of the above polymers with each other or with other monomers containing a vinyl group e.g. vinyl acetate, can also be used, e.g. poly(acrylamide-co-acrylic acid).

A wide range of molecular weights of the poly(acrylic acid) or poly(methacrylic acid) or their derivatives may be used, for example the preferred molecular weight for PAA is greater than 50,000 (for example a molecular weight of 450,000) and also greater than 1,000,000 (for example 1,250,000).

The silicon in the electrode could be any suitable form. The silicon is suitably provided in the form of particles, fibres, sheet-like, pillar-like or ribbon-like particles (as described in WO2008/139157) or pillared particles. Fibres can be made using the techniques disclosed in WO2007/083152, WO2007/083155 and WO 2009/010758. Pillared particles are silicon particles on which pillars have been etched using the above techniques, as disclosed in WO2009/010758.

The silicon is preferably in the form of particles, fibres or pillared particles or a mixture thereof. Silicon particles typically have a diameter in the range 3 to 15 μm, preferably 4.5 μm. The silicon fibres typically have a diameter in the range 80 to 500 nm and a length in the range 20 to 300 μm. Pillared particles typically have a diameter in the range 15 to 25 μm and a pillar height in the range 1 to 4 μm. In addition to silicon as an active material, the cohesive mass may also include within the mix other active materials such as graphite or hard carbon and/or conductive materials, such as carbon black, acetylene black or ketjen black.

The silicon is preferably the cheaper silicon that gives rise to problems with a NaCMC binder discussed above; such silicon will generally have a purity of less than 99.800%, although the surface area of the silicon also seems to have an effect on the level of the impurities that give rise to electrode deterioration. However, the purity should generally be greater than 95.00% by mass in order to ensure that there is sufficient silicon to intercalate the lithium and preferably the purity is greater than 98%. The silicon may include a wide range of impurities, principally iron, aluminium, calcium, titanium, phosphorous, boron and/or carbon present in an amount of up to about 0.2% each.

The silicon granules used to prepare the silicon fibres and pillared particles that are used in the fabrication of the electrodes of the present invention may be crystalline for example mono- or poly-crystalline. The polycrystalline particle may comprise any number of crystals for example two or more.

It will be appreciated that the electrodes of the first aspect of the invention comprise, in addition to a current collector, a cohesive mass, which comprises an active material, a binder and optionally a conductive material. By the term "active material" it should understood to mean (in the context of lithium ion batteries) a material, which is able to incorporate lithium into and release lithium from its structure during the charging and discharging cycles of the battery respectively. The silicon preferably comprises 20 to 100% of the active material in the cohesive mass. Other active materials may be added. Suitable active materials include graphite and hard carbon. In a first embodiment of the electrode of the first aspect of the invention the active material comprises 20 to 100% silicon and from 0 to 80% of an active carbon selected from the graphite and/or hard carbon.

The cohesive mass suitably comprises 50 to 95% active material, preferably 60 to 90% and especially 70 to 80%.

The binder of Table 1 can be used in a mixture with other binders and should form at least 10% by weight, preferably at least 25%, and optionally the binder of Table 1 comprises at least 90% by weight of the total binder content in the electrode. In particular, poly(acylic acid) (PAA)/carboxymethyl cellulose (CMC) combinations and PAA and polyvinyldifluoride (PVDF) combinations should be mentioned.

The cohesive mass suitably comprises 5 to 20% by weight binder, preferably 8 to 15% by weight and especially 8 to 12% by weight binder. Binder contents of 12% are most preferred.

As indicated above, the cohesive mass may optionally include a conductive material. Examples of suitable conductive materials include carbon black, acetylene black, ketjen black, channel black; conductive fibres such as carbon fibres (including carbon nanotubes). The cohesive mass suitably comprises 10 to 30% conductive carbon, preferably 8 to 20% and especially 12 to 14%.

SPECIFIC DESCRIPTION OF PREFERRED EMBODIMENTS

Example 1

Preparation of Electrodes and Testing of Binders

A series of binders were tested by making up anodes using silicon powder as the active material, the binder set out in Table 2 and a conductive carbon black (Super P® carbon black obtained from TIMCAL, Strada Industriale, CH-6743 Bodio, Switzerland, or Denka Black obtained from Denka (Denki Kagaku Kogyo Kabushiki Kaisha, Tokyo) or a mixture thereof) in a ratio of silicon active material:binder: carbon black of 80:8:12 (wt %) or 76:12:12 (wt %). The polymer solutions are pre-made by dissolving the polymer solid material into the appropriate solvent either water or an organic solvent, as set out in Table 2. Specific composite mixes commence with dispersion of the relevant wt. % of the Si active material into a 10-15 wt % bead-milled solution of the carbon black (Super P carbon or Denka Black) by shear stirring for 12 hours. The relevant wt % of polymer solution is then added to this and the resulting composite is subjected to Dual Asymmetric Centrifugation dispersion for 20 minutes.

Alternatively the carbon black may be dispersed into the polymer solution by shear stirring. The silicon material is then added to polymer/carbon mix with a further shear stirring step.

The resultant mix is deposited as a thin 'wet' film onto a copper foil substrate using a draw down blade. The deposited film is left to dry (preferably on a hot-plate at 50 to 70° C.) such that all the solvent (water or organics) is removed to leave the dried composite electrode adhered to the copper foil substrate, which acts as a current collector in the battery cell.

The silicon active material used for testing the binder compositions was one of: (a) silicon powder "J230" from Elkem in Norway which has a mean particle diameter of 4.5 µm, or (b) pillared particles (referred to in Table 2 as "PP"), which are made according to the procedure disclosed in WO2009/010758, or (c) fibres (referred to in Table 2 as "F+"), which are the pillars of the pillared particles once they have been separated from the core of the pillared particles as disclosed in WO 2009/010758.

Chemical analysis of Jetmilled Silgrain® HQ (used as the starting material in the preparation of pillared particles and fibres described in WO2009/010758 and also the brand that J230 material belongs to) from a batch analysis reported as below

| Analysis: | Si wt % | Fe wt % | Al wt % | Ca wt % | Ti wt % |
|---|---|---|---|---|---|
| Max | 99.7 | 0.05 | 0.12 | 0.02 | 0.003 |
| Min | 99.6 | 0.03 | 0.09 | 0.01 | 0.001 |
| Typical | 99.6 | 0.04 | 0.11 | 0.02 | 0.0021 |

The composite electrodes containing the silicon, polymer binder material and carbon, were incorporated into a cell with a lithium metal counter electrode, a microporous separator and an electrolyte in the form of 1.2 mol dm$^{-3}$ lithium hexafluorophosphate in an ethylene carbonate/ethyl methyl carbonate mixture. Discrete samples of the dried composite electrode (containing the silicon, polymer and carbon) of an approximate area of 15 cm$^2$ were assembled in a dry environment with a similar sized area of metallic lithium between which was placed a microporous separator. The cell structure was soaked in the electrolyte solution prior to heat sealing in an aluminium laminate packaging material such that composite electrode and metallic lithium counter electrode could be connected externally via two terminals. The cells were tested for first cycle losses (FCL) by measuring the difference between the charge and discharge capacity (a product of the current and time) for the first charge/discharge cycle of the cell.

The number of charge/discharge/cycles that could be performed reversibly before the capacity of the cell had reached less than 50% of the initial charge capacity was recorded on a computer controlled battery test station. The computer measures the charge and discharge capacity for each cycle and determines the cycle number at which the discharge capacity is less than 50% of the maximum discharge capacity. A summary of the results are set out in Table 2:

TABLE 2

| Polymer | Solvent | Forms of Active Material Tested | Best FCL % | No. of cycles vs Li |
|---|---|---|---|---|
| (1) CMC | Water | J230, PP, F+ | 9.3 | 11 |
| (2) PVP | Water | J230 | 96.9 | 1 |
| (3) PVDF | NMP | J230 | 12.7 | 7 |
| (4) PMMA | NMP | J230 | 89.8 | 2 |
| (5) Ethyl Cellulose | NMP | J230 | 98.6 | 1 |
| (6) PAA | NMP | J230, PP | 8.2 | 21 |
| (7) PAN | DMF | J230 | 15.7 | 11 |
| (8) PAA | Water | J230, PP, F+ | 9.8 | 17 |
| (9) PP | Water | J230 | 25.9 | 4 |
| (10) SBR emulsion | — | J230 | 30.6 | 3 |
| (11) SAN | MEK | J230 | 94.5 | 2 |
| (12) PAM | Water | J230 | 12.5 | 7 |
| (13) PVDC | NMP | J230 | — | — |
| (14) PAA | Methanol | PP | 32.1 | 14 |
| (15) PVC | THF | J230 | — | — |
| (16) PAA/CMC (2:1) | Water | J230, PP, F+ | 11.4 | 10 |

The abbreviations used in Table 2 are set out in Table 3:

TABLE 3

| Abbreviations | |
|---|---|
| CMC | Carboxymethyl Cellulose |
| PVP | Polyvinylpyrrolidone |
| PVDF | Polyvinyldifluoride |
| PMMA | Polymethylmethacrylate |
| PAA | Polyacrylic Acid |
| PAN | Polyacrylonitrile |
| PP | Polypyrrole |
| SBR | Styrene butadiene rubber |
| SAN | Styrene-acrylonitrile |
| PAM | Polyacrylamide |
| PVDC | Polyvinyldichloride |
| PVC | Polyvinylchloride |
| NMP | n-Methylpyrrolidone |
| DMF | Dimethylformamide |
| MEK | Methyl Ethyl Ketone |
| THF | Tetrahydrofuran |

As can be seen from Table 2, PAA binders provided a first cycle loss (FCL) and a lifetime (in terms of the number of cycles) exceeding other binders, especially in NMP solvent.

All lithium ion cells have some first cycle loss. An FCL value >20% indicates that the binder is not maintaining electrical contact between the silicon particles and the copper current collector, as the silicon particles expand and contract.

Some tests were performed using an active material (Si):Binder:Carbon ratio (in wt %) of 74:13:13, with polymer binders NaCMC (using a water based solvent) and PAA (using both water and organic solvents) and such composite anodes produced first cycle losses in the region of 8-9% FCL.

Example 2

Measuring First Cycle Loss

Figure 2:
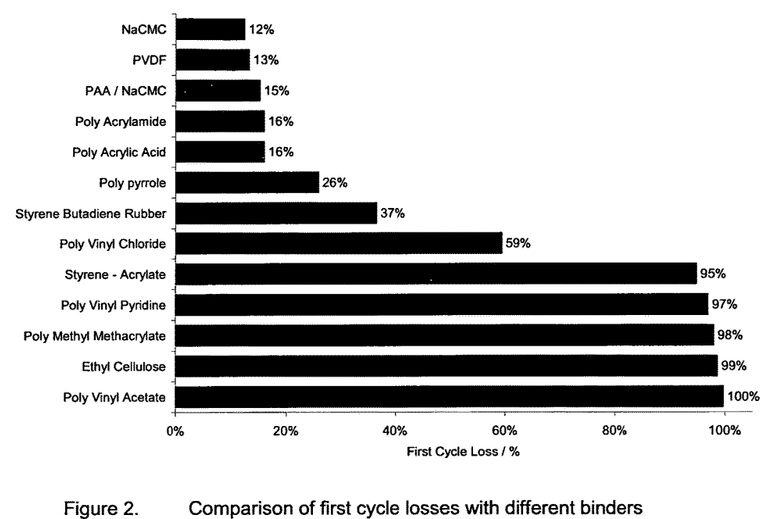
FIGS. 2-7 are graphs showing the results of Examples 2-7

Using the same cell structure and method of manufacture as in Example 1, cells with various binders as per Table 2 were formed and tested for FCL. The results of the FCL tests for the various binders are shown in the bar chart of FIG. 2. It should be noted that Table 2 includes a wider range of experiments including the different composition ratios such as 74:13:13 whereas FIG. 2 is based on a standard formulation of 80:8:12.

Example 3

Figure 3:
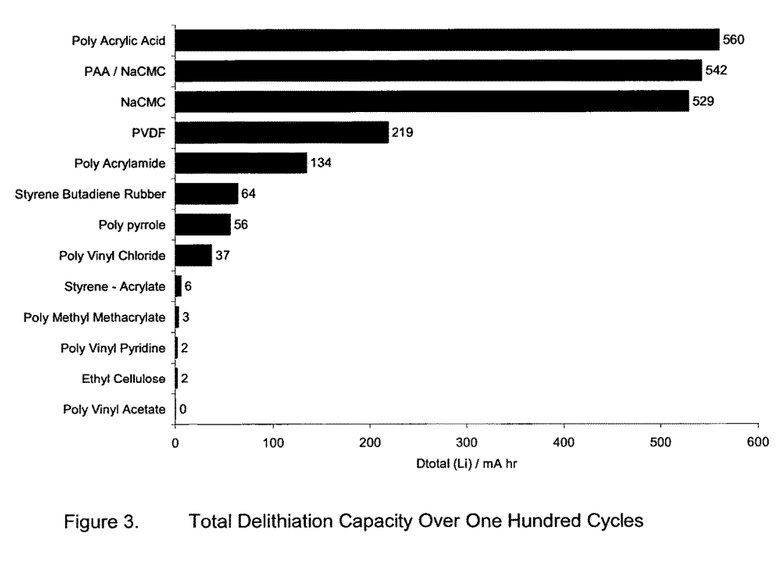

Using the same cell structure and method of manufacture as in Example 1, cells with various binders were formed as per Table 2 and tested to find the effect of the anode binder on the cycling capacity and the results are shown in the bar chart of FIG. 3. FIG. 3 shows the total delithiation capacity for silicon powder composite electrodes with a lithium metal counter electrode. Delithiation capacity is the amount of lithium capacity in mA hr from the test sample cells associated with the electrochemical step equivalent to the discharge in a real Li-ion cell (i.e. where lithium is removed from the silicon material) The total delithiation capacity is the cumulative amount of capacity from the all the cycles up to the point where the test cell was deemed to have failed.

Lithium metal electrodes have a limited cycle life, because of the porous and non-uniform deposits that form when lithium is plated back on to the anode during recharging. Typically, the total amount of capacity that can be passed with the standard cell construction is 500-600 mA hr, before the lithium electrode fails. Therefore, if the capacity is >500 mA hr, the cell has failed because of the lithium metal counter electrode. However, if the capacity is <500 mA hr, the cell has failed because of the silicon powder composite electrode. Therefore, most of the binders do not allow the electrode to cycle well.

Example 4

Using the same cell structure and method of manufacture as in Example 1, cells with various binders were formed using the solvents as per Table 2 and tested to find the effect of binder on the cycling capacity of the cell.

Figure 4:
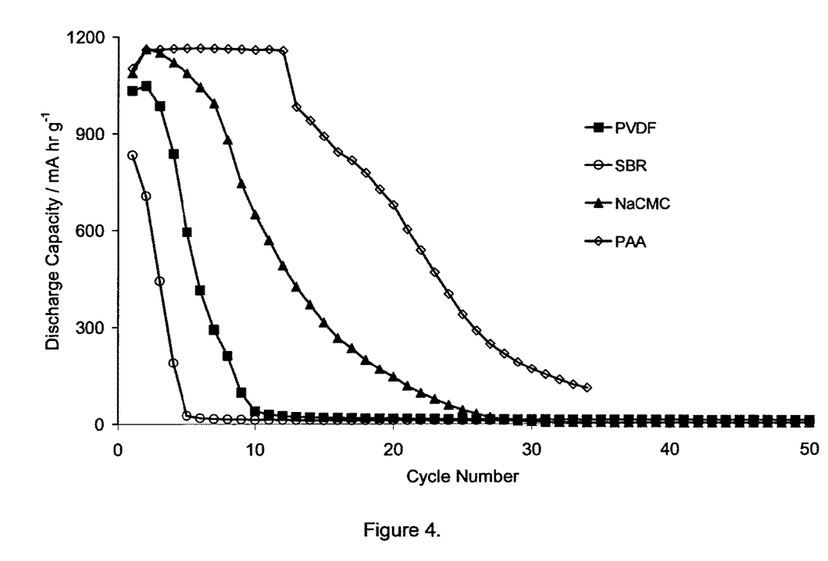

The results are shown in FIG. 4, which shows the delithiation capacity of the Silgrain® HQ J230 silicon powder composite electrodes, using four different types of binder; PVDF, SBR, NaCMC and PAA. The lithiation capacity on the first cycle was limited to 1200 mA hr $g^{-1}$, based on the weight of silicon powder in the electrode. Lithiation on subsequent cycles was limited to a charge and/or voltage limit.

As explained above, the cycling of these cells is ultimately limited by the lithium metal counter electrode. However, it is evident that the cells with both PVDF and SBR lose capacity much earlier—before the lithium metal counter electrode is compromised.

Example 5

Various cells were made using the following methodology:

An active mass was applied to a copper substrate to form an anode and the assembly was dried, as described in Example 1. The cathode materials used in the cells were commercially supplied standard cathode materials and were used together with an aluminium current collector. Anodes and cathodes of the required size were cut out and then re-dried overnight at 120° C., under dynamic vacuum. Tags were ultrasonically welded to the anode and cathode, to allow the cells to be sealed inside an aluminium laminate bag and the electrodes were then assembled with one layer of Tonen™ porous polyethylene separator between them, wound into a roll and placed in the laminate bags. The cell windings were sealed inside the bags, with one edge left unsealed to allow for electrolyte filling.

The cells were filled with the required weight of electrolyte, under partial vacuum. The electrolyte was 1 M LiPF$_6$ in 3:7 EC (ethylene carbonate):EMC (ethyl methyl carbonate). The electrolyte was allowed to soak into the electrodes for one hour and the final edge of the bag was then vacuum sealed.

The cells were connected to an Arbin™ battery cycling rig, and tested on continuous charge and discharge cycles. The test protocol used a capacity limit and an upper voltage limit on charge, and a lower voltage limit on discharge. The cells were charged up to a capacity of 1200 mAhr/g.

A series of binders were tested by making up anodes using the above methodology; the active anode mass was J230 silicon powder (sold as one of the Silgrain HQ products from Elkem, Norway), the binders set out in Table 4 and a conductive carbon black (Super P® carbon black) in a ratio of silicon active material (A):binder (B):Super P® carbon (C) set out in Table 4. Table 4 also sets out the cathode used in the various tests, where "MMO" stands for a mixed metal oxide (specifically $Li_{1+x}Ni_{0.8}Co_{0.15}Al_{0.05}O_2$ where $0<x<1$, preferably $0.05<x<0.1$) cathode and "LCO" stands for a lithium cobalt oxide (LiCoO$_2$) cathode, both of which are well-known and are commercially available.

TABLE 4

| I. D. | Binder | Composition A:B:C | Cathode |
|---|---|---|---|
| 1 | PAA | 76:12:12 | MMO |
| 2 | NaCMC | 80:8:12 | LCO |
| 3 | PVDF | 65:15:20 | MMO |
| 4 | PVA | 80:8:12 | LCO |
| 5 | SBR | 70:16:14 | LCO |
| 6 | PAM-co-AA | 76:12:12 | LCO |
| 7 | PBMA | 76:12:12 | LCO |
| 8 | PMA-OD | 76:12:12 | LCO |

The abbreviations in Table 4 are set out in Table 5

TABLE 5

| PAA | Poly(acrylic acid) |
|---|---|
| NaCMC | Sodium carboxymethyl cellulose |
| PVDF | Polyvinyldifluoride |
| PVA | Polyvinyl alcohol |
| SBR | Styrene Butadiene Rubber |
| PAM-co-AA | Polyacrylamide acrylic acid copolymer |
| PBMA | Poly(butyl methacrylate) |
| PMA-OD | poly(maleic anhydride-alt-1-octadecene) |

Figure 5:
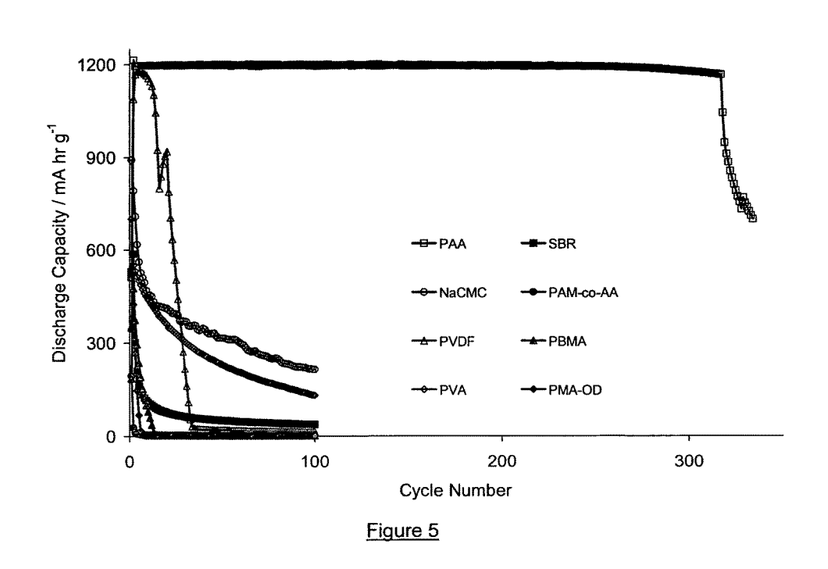

FIG. 5 shows the effect of different binders on the discharge capacity during constant charging/discharging cycling. As can be seen, PAA binders provided substantially better maintenance of discharge capacity compared to other cells.

Example 6

Silicon Fibres

Binders were tested by making up anodes using the methodology of Example 5 except that silicon fibres prepared using the methods set out in WO 2007/083152 or WO 2007/083155 were used instead of silicon powder. Such fibres typically have a diameter in the range 80 to 500 nm and a length in the range 20 to 300 µm. The binders and other variables in the cells are set out in Table 6.

TABLE 6

| I. D. | Binder | Composition A:B:C | Cathode |
|---|---|---|---|
| 1 | PAA | 80:8:12 | LCO |
| 2 | PAA (NMP) | 80:8:12 | LCO |
| 3 | NaCMC | 80:8:12 | LCO |
| 4 | PVDF-g-AA | 80:8:12 | LCO |
| 5 | PVDF | 74:14:12 | MMO |
| 6 | MHPC | 80:8:12 | LCO |
| 7 | PE | 74:14 12 | MMO |
| 8 | PVPS | 80:8:12 | LCO |
| 9 | PE-MA-GM | 80:8:12 | LCO |
| 10 | PMA-O | 80:8:12 | LCO |

The abbreviations in Table 6 are set out in Table 7

TABLE 7

| PAA | Poly(acrylic acid) |
|---|---|
| PAA (NMP) | Poly(acrylic acid) using NMP solvent |
| NaCMC | Sodium carboxymethyl cellulose |
| PVDF-g-AA | Polyvinyldifluoride graft polymer with acrylic acid |
| PVDF | Polyvinyldifluoride |
| MHPC | Methylhydroxypropylcellulose |
| PE | Polyethylene |
| PVPS | Polyvinylpyrrolidone-co-styrene |
| PE-MA-GM | Poly-ethylene-maleic anhydride-glycidyl methacrylate |
| PMA-OD | Poly(maleic-anhydride-alt-1-ocatdecene) |

Figure 6:
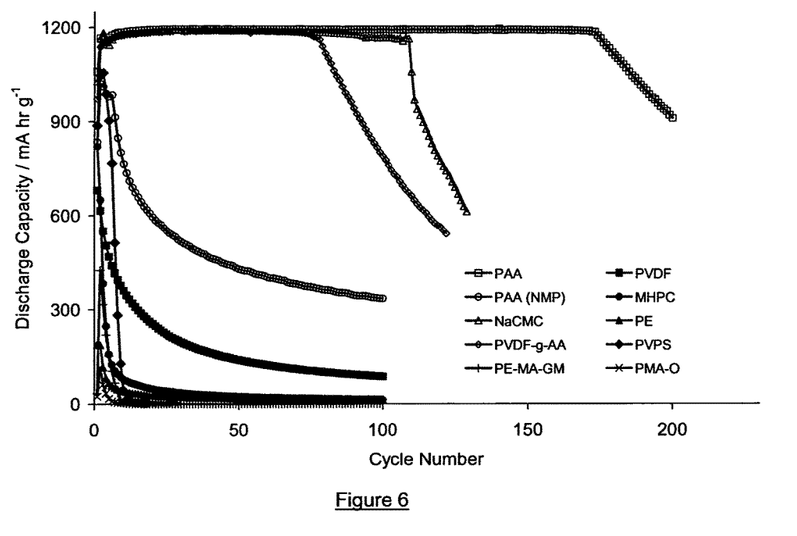

FIG. 6 shows the effect of different binders on the discharge capacity during constant charging/discharging cycling. As can be seen, PAA binders provided substantially better maintenance of discharge capacity compared to the binders used in the other cells.

Example 7

Silicon Powder Particles

Binders were tested by making up anodes using the methodology of Example 5 except that the silicon is in the form of pillared particles prepared according to the methods set out in WO 2009/010758, (which have a diameter in the range 15 to 25 µm and a pillar height in the range 1 to 4 µm) instead of silicon powder. The binders and other variables in the cells are set out in Table 8.

TABLE 8

| I. D. | Binder | Composition A:B:C | Cathode |
|---|---|---|---|
| 1 | PAA | 80:8:12 | LCO |
| 2 | NaCMC | 80:8:12 | LCO |
| 3 | PVDF-g-AA | 76:12:12 | MMO |
| 4 | PVDF | 80:8:12 | MMO |
| 5 | Polyimide | 80:8:12 | MMO |

Figure 7:
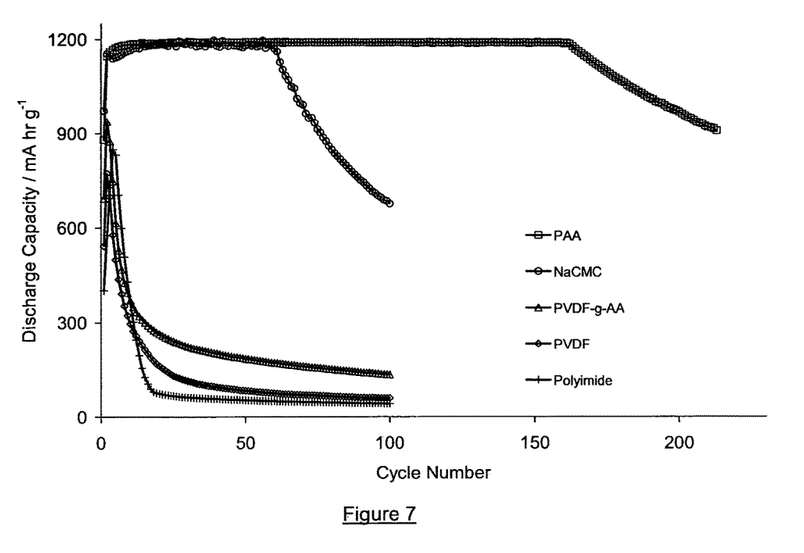

FIG. 7 shows the effect of different binders on the discharge capacity during constant charging/discharging cycling. As can be seen, PAA binders provided substantially better maintenance of discharge capacity compared to the binders used in the other cells.

The invention claimed is:

1. An electrode for a lithium ion rechargeable battery cell comprising:
   a current collector;
   a cohesive mass disposed against the current collector, the cohesive mass comprising:
      an active material comprising 20 to 100 wt % of a plurality of active silicon particulates, each of the plurality of the active silicon particulates having a purity of at least 95.00 wt % silicon, the active material being present in the cohesive mass in an amount within the range of 50-95% of the total weight of the cohesive mass; and a polymeric binder comprising a homopolymer of polyacrylic acid or an alkali metal salt thereof, each monomeric unit of the homopolymer having the structural formula (—CH$_2$—CH—(COOX)—) in which each X is H or an alkali metal ion, the homopolymer of polyacrylic acid or the alkali metal salt thereof making up at least 25 wt % of the total binder content of the electrode, wherein the polymeric binder and active material are mixed together such that the polymeric binder binds together the plurality of active silicon particulates such that the polymeric binder is in contact with the silicon particulates, to form the cohesive mass, which adheres to and remains in electrical contact with the current collector, and wherein the electrode is capable of maintaining substantially constant discharge capacity during charging/discharging cycling for at least 150 cycles.

2. An electrode according to claim 1, wherein the active silicon particulates are one or more of silicon particles, silicon fibres and silicon pillared particles.

3. An electrode according to claim 1, wherein the active silicon particulates have a purity of less than 99.8 wt % silicon.

4. An electrode according to claim 1, wherein the active silicon particulates have a purity of greater than 98 wt % and less than 99.8 wt % silicon.

5. An electrode according to claim 1, wherein the active silicon particulates comprise 99.6 wt % silicon.

6. An electrode according to claim 1, wherein the active silicon particulates comprise 99.7 wt % silicon.

7. An electrode according to claim 1, wherein the polymeric binder comprises a mixture of the homopolymer of polyacrylic acid and a second binder.

8. An electrode according to claim 7, wherein the second binder is an elastomeric binder selected from carboxymethyl cellulose (CMC) and/or polyvinylidinedifluoride or a mixture thereof.

9. An electrode according to claim 1, wherein the homopolymer of polyacrylic acid has a molecular weight of greater than 50,000.

10. An electrode according to claim 1, wherein the cohesive mass further includes a conductivity-enhancing material.

11. An electrode according to claim 10, wherein the conductivity-enhancing material comprises one or more materials selected from carbon black and acetylene black.

12. An electrode as claimed in claim 1, which is an anode.

13. An electrode according to claim 1, wherein the active material further comprises greater than 0% and up to 80% of active carbon selected from graphite and/or hard carbon, wherein the polymeric binder binds together the plurality of active silicon particulates the active carbon.

14. A lithium ion cell including an electrode as claimed in claim 1.

15. A device including an electrode according to claim 1 or a lithium ion cell according to claim 14.

16. An electrode according to claim 1, wherein the cohesive mass consists of the active material, the polymeric binder and optionally at least one conductivity-enhancing material.

17. An electrode according to claim 1, wherein the silicon particulates further comprise one or more impurities selected from a group consisting of aluminum, boron, phosphorus or carbon in an amount up to 0.2 wt % each.

18. An electrode according to claim 1, wherein the cohesive mass comprises between 76 to 80 wt % of the active material, between 8 and 12 wt % of the polymeric binder and 12 wt % of a conductive carbon.

19. The electrode of claim 1, wherein the electrode is capable of maintaining substantially constant discharge capacity during charging/discharging cycling for at least 300 cycles.

20. The electrode of claim 1, wherein substantially constant discharge capacity is about 1,200 mAh/g.

21. The electrode of claim 19, wherein the substantially constant discharge capacity is about 1,200 mAh/g.

22. The electrode of claim 1, wherein the electrode has a first cycle loss of 20% or less.

23. The electrode of claim 1, wherein the electrode is has a total delithiation capacity of at least 500 mA hr.

24. The electrode of claim 1, wherein the polymeric binder binds to the silicon particulates.

25. An electrode according to claim 1, wherein each of the silicon particulates is selected from a silicon particle, a silicon fiber, a sheet-like silicon particle, a pillar-like silicon particle, a ribbon-like silicon particle, or a pillared silicon particle.

26. An electrode according to claim 1, wherein each of the silicon particulates is selected from a silicon particle having a diameter in the range of 3 to 15 microns, a silicon fiber having a diameter in the range of 80 to 500 nm and a length in the range of 20 to 300 microns, and a pillared particle having a diameter in the range of 15 to 25 microns and a pillar height in the range of 1 to 4 microns.

27. An electrode according to claim 1, wherein each of the silicon particulates has a purity of greater than 98% wt % silicon.

28. An electrode according to claim 1, wherein each of the silicon particulates has a purity of less than 99.8 wt % silicon.

29. An electrode according to claim 1, wherein the polymeric binder comprises at least 90 wt % of the homopolymer of poly(acrylic acid) or the alkali metal salt thereof.

30. An electrode according to claim 1, wherein the active material is present in the cohesive mass in an amount within the range of 50-90% of the cohesive mass.

31. An electrode according to claim 1, wherein the cohesive mass does not include an active carbon material.

* * * * *